No. 808,721. PATENTED JAN. 2, 1906.
C. R. BULLARD.
NON-SKIDDING DEVICE FOR TIRES.
APPLICATION FILED JULY 6, 1905.
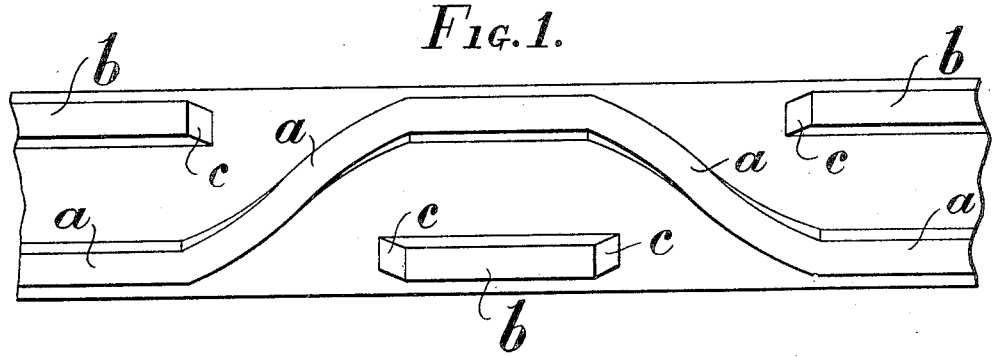
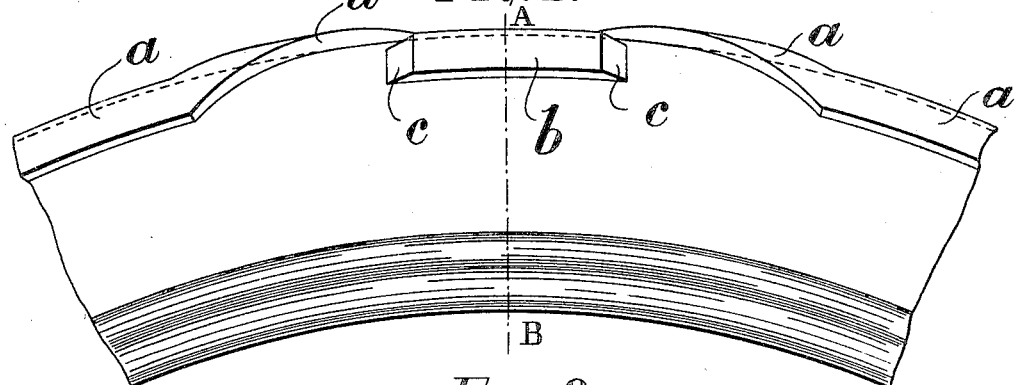
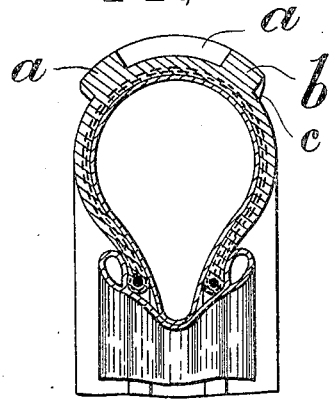
Witnesses:
L. E. Barkley
W. E. Lawson
Inventor
Charles Robert Bullard
by Frank L. Appleman
atty

UNITED STATES PATENT OFFICE.

CHARLES ROBERT BULLARD, OF ST. IVES, COUNTY OF HUNTINGDON, ENGLAND.

NON-SKIDDING DEVICE FOR TIRES.

No. 808,721.  Specification of Letters Patent.  Patented Jan. 2, 1906.

Application filed July 6, 1905. Serial No. 268,588.

*To all whom it may concern:*

Be it known that I, CHARLES ROBERT BULLARD, a citizen of the United Kingdom of Great Britain and Ireland, residing at St. Ives, county of Huntingdon, England, have invented certain new and useful Improvements in Non-Skidding Devices for Tires of Cycles, Motor-Cars, and the Like, of which the following is a specification, such as will enable others skilled in the art to which it appertains to make and use the same.

This invention refers to non-skidding devices for tires; and it consists in forming on the surface or tread of the tire or on a band of rubber or other suitable material to be placed over the tire a raised rib or strip of rubber, leather, or other tough flexible material in zigzag pattern—that is to say, bent from side to side—with additional pieces of similar or dissimilar material placed lenthwise between the bends or bays of the zigzag in order to give a level or approximately level bearing to the tire. For cycles the zigzag strip is about three-sixteenths of an inch thick and one-quarter of an inch wide and is of peculiar formation, having a straight bar, preferably about one or one and a half inches long, inserted between the ends of the angular or slanting bars which form the the zigzag. The sizes may vary to suit requirements. The effect of these bars is to create more space between the bends and give them a semi-sexagonal appearance. The additional pieces are formed with slanting or sloping ends to lessen liability to pick up mud, dust, or water. The device may be solid with the tire or the band or be riveted or otherwise attached thereto.

The special shape of my non-slipping device effectually prevents slipping on either side and also reduces liability to puncture.

I will now describe my invention with reference to the accompanying drawings, in which—

Figure 1 is a plan view of part of a tire formed with zigzag strip and additional pieces according to my invention. Fig. 2 is a side elevation of tire shown in Fig. 1. Fig. 3 is a section on the line A B of Fig. 2.

$a$ is the zigzag strip, and $b$ $b$ are the additional pieces arranged in the bays of the strip $a$, the ends of which pieces are sloped at $c$.

What I claim, and desire to secure by Letters Patent, is—

In combination, a tire, a continuous strip comprising a plurality of straight portions at each side of the tread of the tire, connected by angular portions; and separate bars arranged parallel with the straight portions at one side of the tread of the tire.

In witness whereof I have hereunto set my hand in presence of two witnesses.

CHARLES ROBERT BULLARD.

Witnesses:
SAMUEL S. BROMHEAD,
HENRY FAIRBROTHER.